June 13, 1967
O. GRANNING
3,325,181
LIFTING ARRANGEMENT FOR VEHICLE AXLES
Filed June 10, 1965
3 Sheets-Sheet 1
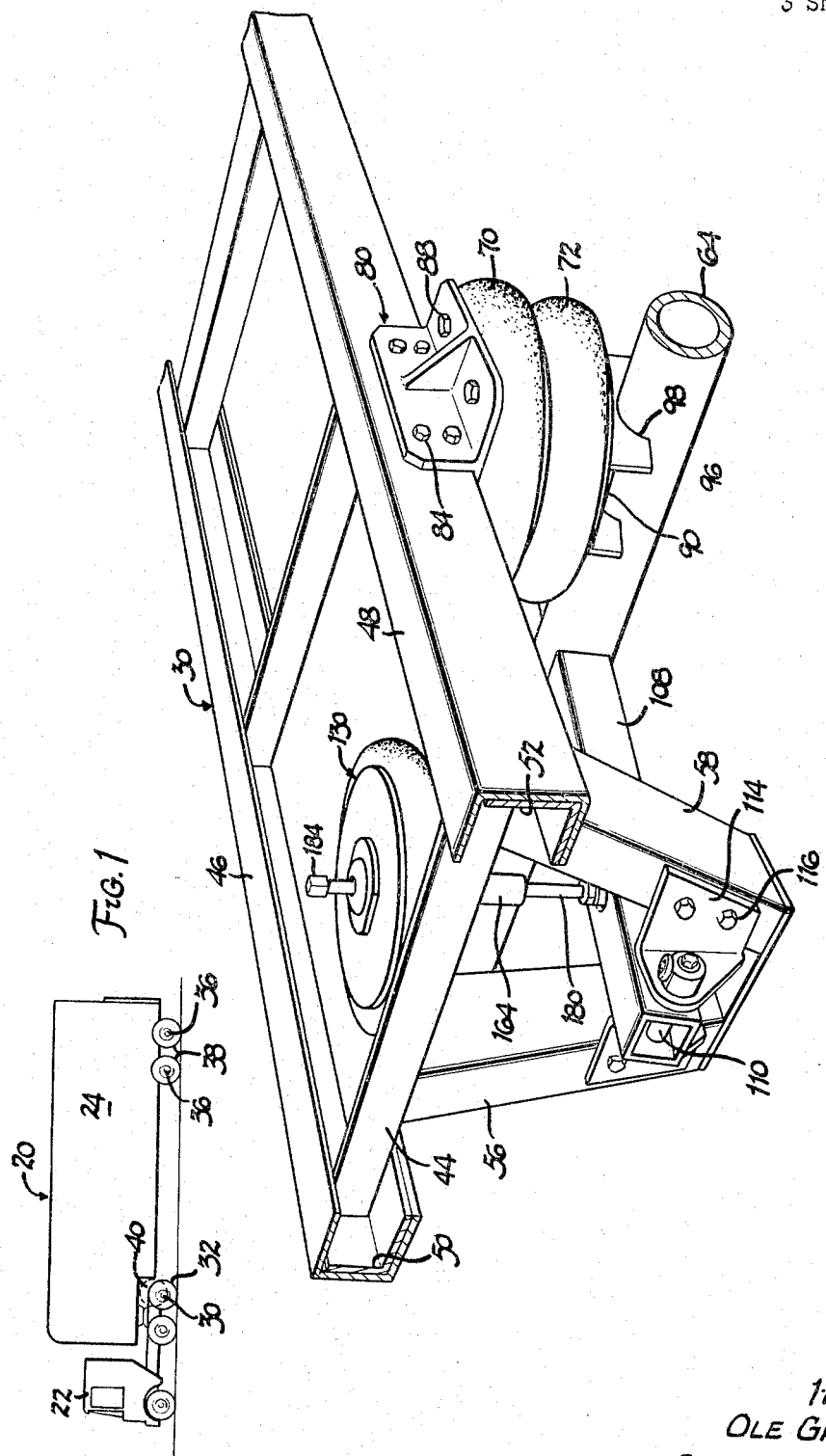
Inventor.
OLE GRANNING
By
Wilson, Settle, Batchelder & Craig
ATTORNEYS

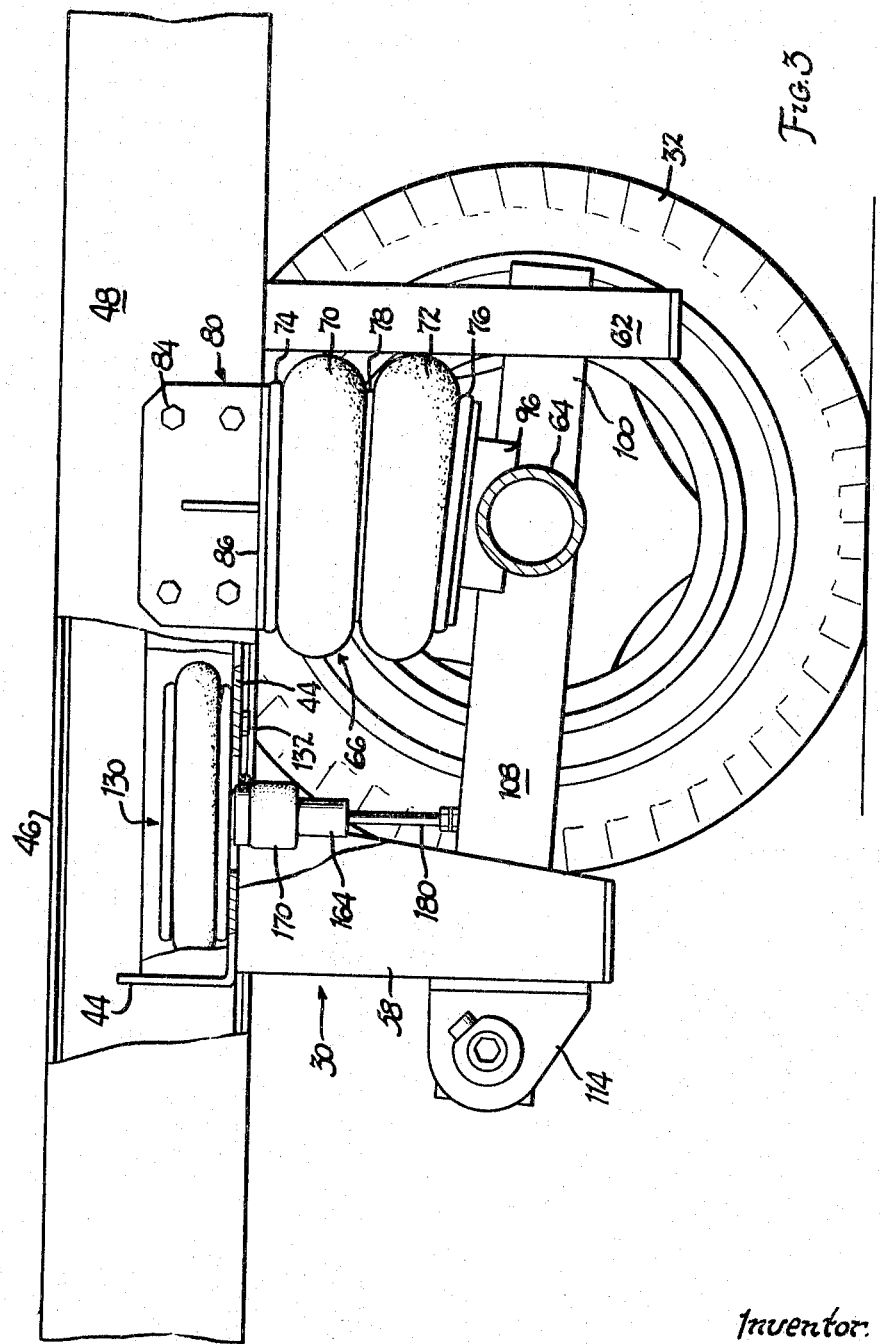

Inventor.
OLE GRANNING
By
Wilson, Settle, Batchelder & Craig
ATTORNEYS

United States Patent Office 3,325,181
Patented June 13, 1967

3,325,181
LIFTING ARRANGEMENT FOR VEHICLE AXLES
Ole Granning, Detroit, Mich., assignor to Ole Granning Trailer Service, Inc., Dearborn, Mich., a corporation of Michigan
Filed June 10, 1965, Ser. No. 462,964
3 Claims. (Cl. 280—43.23)

This invention relates to vehicles and more particularly to a lifting arrangement for vehicle axles.

In vehicles including tractors and trailers it is necessary to have various wheel carrying axles for certain heavy load conditions on the vehicle. Under less or no load conditions, it has been found desirable to lift one or more of the axles so that the wheels thereon are above contact with road conditions to save wear on the tires and fuel on the tractor.

It is an object of my invention to provide an improved lifting arrangement for vehicle axles.

Another object is to provide an improved pneumatic lifting device for vehicles.

Another object of my invention is to provide a single lifting device located midway between the sides of the vehicle and which is capable of lifting an axle thereof.

Another object of my invention is to provide an improved lifting arrangement for vehicle axles which is inoperative and ineffective when the axles are in lowered position with the wheels on the road surface.

Another object is to provide an improved vehicle axle assembly.

Other objects of this invention will appear in the following description and appended claims, reference being had to the accompanying drawings forming a part of this specification wherein like reference characters designate corresponding parts in the several views.

In the drawings:

FIGURE 1 is a diagrammatic side view in elevation of a vehicle including a tractor coupled with a trailer and embodying features of my invention;

FIGURE 2 is a perspective fragmentary view of the vehicle showing the lift arrangement of the axle therof;

FIGURE 3 is a fragmentary side view of the vehicle showing the axle assembly thereof;

Figure 4:
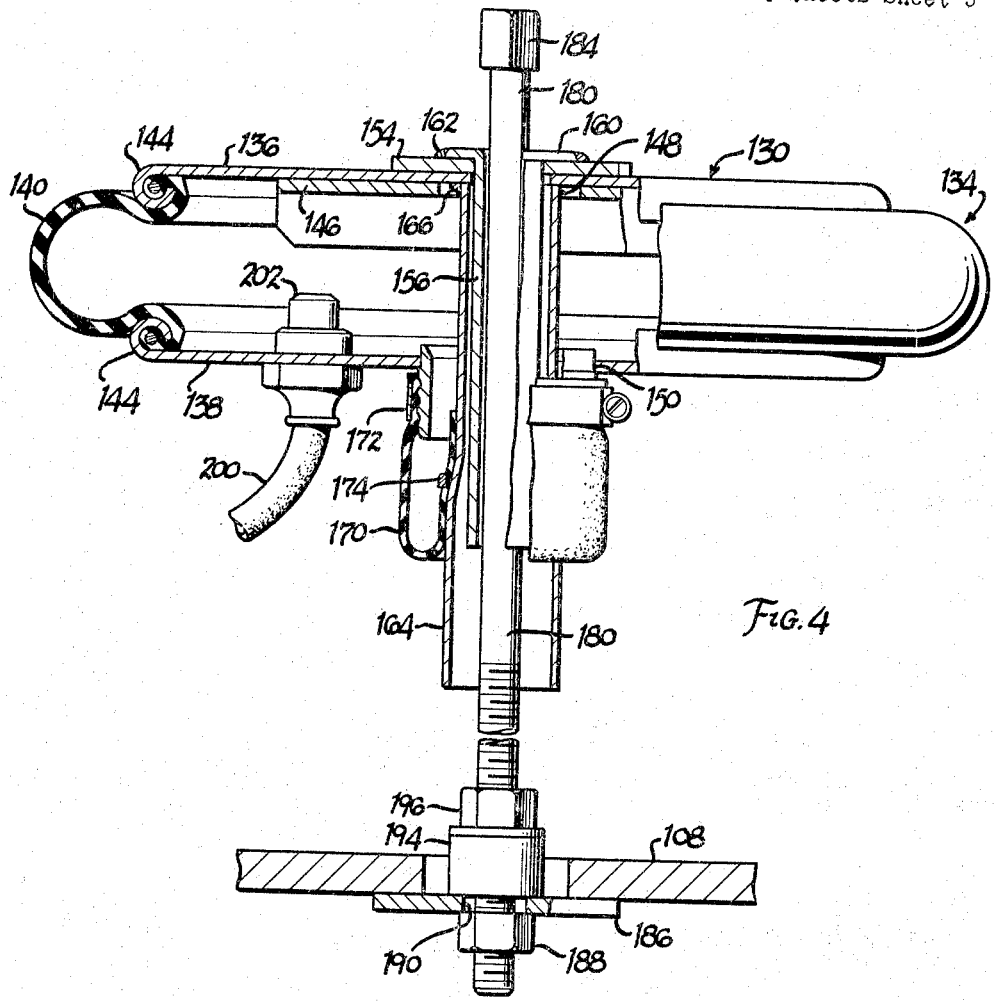
FIGURE 4 is a view, partly broken away of the lift element of the vehicle.
Figure 5:
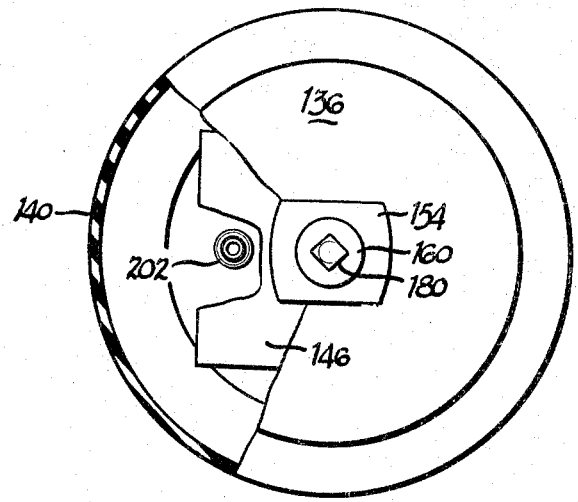
FIGURE 5 is a top view in elevation, partly broken away, of the lift element shown in FIGURE 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limtitation.

Referring to the drawings and particularly FIGURE 1 the numeral 20 designates a vehicle which includes a tractor 22 and a trailer 24. The tractor includes my improved axle lifting assembly 30 having wheels 32 on each side thereof. The trailer 24 has two axles 36 having wheels 38 on each side thereof. The axle 30 embodying features of my invention may be substituted for either of the axles and wheel arrangement of the trailer.

In accordance with my invention I provide the axle lifting assembly 30 which permits the raising of the wheels 32 to the dotted line position 40. This is desirable when the load on the vehicle is light or no load to provide easier steering, shorter turning radius, softer ride and increased tire life for the tires on the axle which is lifted.

Referring to FIGURES 2 and 3 it may be seen that the axle lifting assembly 30 includes a rectangular axle frame 44 which is mounted on a pair of spaced apart frame channel members 46 and 48. The channel members 46 and 48 are provided with reinforcing angle members 50 and 52, respectively.

As may be seen in FIGURE 2, a pair of tubular legs 56 and 58 depend from the front end of the frame 44. The legs 56 and 58 are spaced apart and angled inwardly to form a V-shaped structure. The lower ends of the legs 56 and 58 are secured together by a plate 60.

FIGURE 3 shows guide means 62 which extend downward from the frame 44 at the rear thereof. The guide means 62 is the same as disclosed in my Patent No. 3,133,745 issued May 19, 1964.

An axle 64 which supports the wheels 32 is supported between the front and rear of the axle frame 44 and is suspended from the frame channel members by a pair of pneumatic springs 66 located adjacent each end of the axle. The springs 66 are of conventional structure and each comprises a pair of flexible air bags 70 and 72. The bags 70 and 72 have upper and lower metallic reinforcing discs 74 and 76 vulcanized thereto and a center disc 78 vulcanized to the bags to join them together. A conventional pneumatic circuit (not shown) is associated with each spring to supply the bags with the desired amount of air under pressure to maintain the bags at the proper air pressure. In operation, an upward force on the bags will cause air to be expelled from the bags, permitting collapse thereof to accommodate upward movement of the axle. The control system associated with the bags will subsequently cause the air pressure within the bags to increase thus forcing the axle back downwardly to its normal position.

The springs 66 are secured to the frame channel member by means of a bracket 80. The bracket 80 has one leg 82 extending upwardly and secured to the exterior of the frame channel member by bolts 84. The horizontal member 86 of the bracket is secured to the upper disc 74 by bolts 88.

The springs 66 are secured to the axle by bracket 90 which is secured to the lower disc 76 by bolts (not shown). Extending downwardly from the bracket 90 are spaced projections 96 having circular recesses 98 which are received on the axle 64. The projections 96 are welded to the axle to thus secure the axle to the springs 66.

Extending rearwardly from the axle 64 is a guide bar 100 which is welded to the axle at the longitudinal center thereof. The guide bar 100 is received in the guide means 62 which permits vertical movement of the bar 100 but prevents lateral movement of the bar and axle.

A tubular drawbar 108 extends forwardly from the axle and is welded thereto on one end thereof at the longitudinal center thereof and in axial alignment with the guide bar. The opposite end of the drawbar 198 is pivotally mounted on a pin 110 carried by angle plates 114 which are secured to tubular members 56 and 58 by bolts 116. The pivot connection between the drawbar 108 and pin 110 permits a tilting movement upward as regards guide bar 100, axle 64 and drawbar 108 under the constraint of the springs 66. the front end may be covered to keep out dirt and the like by any suitable means (not shown).

In order to raise the axle 64, I provide an improved pneumatic axle lift element 130 which is mounted on the axle frame 44 by bolts 132. This lift element includes an annular air lift bag 134. The bag 134 includes an upper metallic disc member 136, a lower metallic disc member 138 and a flexible ring 140 which ring is preferably made of rubber. The disc members are curled about the ring 140 as at 144. The disc member 136 has a reinforcing metallic plate 146 secured to its underside.

The disc 136 is provided with an opening 148 and the lower disc is provided with an opening 150. A metallic plate 154 is positioned above the opening 148 and preferably spot welded to disc 136. A guide tube 156 extends through an opening in the plate 154, opening 148 in disc 136 and opening 150 in disc 138. The guide tube 156 is provided with an annular flange 160 at its upper end and is welded to plate 154 at 162. A tubular member 164 surrounds guide tube 156 and is welded to the underside of disc 136 as at 166 to seal the opening 148. Surrounding tubular member 164 is an enlarged annular tube 168 which is press fitted into opening 150 in disc 138 and extends therebelow.

A rubber boot 170 is secured to tube 168 by metallic clamp 172. It will be noted that the boot and tube are provided with mating grooves to result in an airtight seal. The other end of the boot is secured to tube 164 by a metallic band 174. The tube 164 is tapered so that a wedging action is provided for a good seal. When the bag is inflated, the seal tends to be wedged tighter, thus, avoiding the possibility of a leak during use. Thus, the annular air lift bag 134 is sealed against leakage and has a passage through the central part thereof by reason of the guide tube 156.

A hanger bar or member 180 extends through the guide tube 156 in slidable relation. The bar 180 has on its upper end an enlarged portion or stop 184. The opposite end is secured to the drawbar 108 by a metallic plate 186 and nut 188. The plate 186 has an opening 190 which is larger than the diameter of the bar 180 but not as large as nut 188 to permit tilting of the drawbar 108. A rubber spacer 194 is locked against plate 186 by nut 196. The nuts 188 and 196 plus the rubber spacer permit the raising and lowering of the drawbar upon movement of the hanger bar 180. If desired, the drawbar may be omitted and the hanger bar 180 may be connected directly to the axle 64.

As shown in FIGURE 4 the annular lift bag 134 is deflated. When the bag is inflated the flange 160 engages stop 184 to raise the drawbar 180 which in turn raises the drawbar 108 and axle 64 to remove wheels 32 from the road surface. When deflated the parts return to their normal position. The bag 134 may be inflated by air received through a tube 200 and nozzle 202. Air supply may be controlled through the tube 200 in both directions by any suitable air pump and a two-way valve (not shown). The air pump may be operated from the motive power of the tractor 22 and the valve by hand inside the cab of the tractor. With the valve being in one position the bag 134 is inflated and when the valve is in another position the bag is deflated and the air is dissipated into the atmosphere.

During operation with the wheels on the road any movement upwardly will move the drawbar and hanger bar upwardly but there will be no flexing of the bag 134 since the hanger bar 180 slides in guide tube 156 thus preserving the life of the bag 134.

By placing the axle lifting element 130 midway between the frame channel members with the hanger bar through the central portion of the air bag 134 and with the drawbar immediately therebelow I require only one element 130 to raise the axle 64.

Having thus described by invention, I claim:

1. A lifting assembly for vehicle axles comprising an axle suspension, an axle, wheels mounted on said axle, a pneumatic lift element carried by the vehicle, a tube extending through said lift element, and a hanger member associated with said axle and having a portion of lesser diameter than said tube and extending therethrough and being provided with a stop to be engaged by said lift element upon inflation thereof to raise the hanger lift member and said axle.

2. A lifting assembly for vehicle axles comprising an axle suspension, an axle, wheels mounted on said axle, a pneumatic lift element carried by the vehicle, a tube extending through said lift element, a drawbar attached to said axle, and a hanger member attached to said drawbar and having a portion of lesser diameter than said tube and extending therethrough and being provided with a stop to be engaged by said lift element upon inflation thereof to raise the hanger member, drawbar and said axle.

3. A pneumatic lifting assembly for vehicle axles comprising an axle, wheels mounted on said axle, an inflatable lift element, a guide tubing extending through said lift elements, and a hanger member slidably positioned in said tube and having a stop member on one end and being associated with said axle on the other end to raise said axle upon inflation of said lift element to the extent said element moves said stop member.

References Cited

UNITED STATES PATENTS

| | | | |
|---|---|---|---|
| 1,109,499 | 9/1914 | Zierden | 92—43 X |
| 1,295,471 | 2/1919 | Fleury | 92—44 |
| 2,844,228 | 7/1958 | Schnell | 92—44 X |
| 2,869,887 | 1/1959 | Westberg | 280—43.23 |
| 2,947,547 | 8/1960 | Gouirand | 280—43.23 |
| 2,957,593 | 10/1960 | Evans | 280—43.23 |
| 3,001,796 | 9/1961 | Martin | 280—43.23 X |
| 3,096,995 | 7/1963 | Richnow | 180—22 |
| 3,099,189 | 7/1963 | Blondiau | 92—44 X |
| 3,133,745 | 5/1964 | Granning | 280—112 |

FOREIGN PATENTS 1,242,573 12/1959 France.

BENJAMIN HERSH, *Primary Examiner.*

C. C. PARSONS, *Assistant Examiner.*